(12) United States Patent
Iritani et al.

(10) Patent No.: US 8,727,761 B2
(45) Date of Patent: May 20, 2014

(54) DIE FOR UNDERWATER CUTTING TYPE PELLETIZER

(75) Inventors: Kazuo Iritani, Takasago (JP); Shin Iwasaki, Takasago (JP); Nobuki Nagami, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 214 days.

(21) Appl. No.: 13/142,155

(22) PCT Filed: Dec. 10, 2009

(86) PCT No.: PCT/JP2009/070645
§ 371 (c)(1),
(2), (4) Date: Jun. 24, 2011

(87) PCT Pub. No.: WO2010/073912
PCT Pub. Date: Jul. 1, 2010

(65) Prior Publication Data
US 2012/0009291 A1 Jan. 12, 2012

(30) Foreign Application Priority Data
Dec. 26, 2008 (JP) .................................. 2008-332758

(51) Int. Cl.
| B29C 47/86 | (2006.01) |
| B29C 47/78 | (2006.01) |
| B29C 47/30 | (2006.01) |
| B29B 9/06 | (2006.01) |

(52) U.S. Cl.
USPC ........ 425/378.1; 425/549; 425/547; 425/464; 425/382 R; 425/378.2; 425/310; 425/192 R; 425/67

(58) Field of Classification Search
CPC .......... B29B 9/06; B29B 9/065; B29C 47/30; B29C 47/822; B29C 47/86
USPC ......... 425/67, 68, 461, 464, 307, 310, 192 R, 425/378.1, 378.2, 379.1, 382 R, 463, 547, 425/549
See application file for complete search history.

(56) References Cited

U.S. PATENT DOCUMENTS 3,461,495 A * 8/1969 Curati et al. ............... 425/192 R
3,492,716 A * 2/1970 McNeal, Jr. .................. 228/175
(Continued)

FOREIGN PATENT DOCUMENTS

CN 101107108 1/2008
DE 38 09 735 C1 6/1989
(Continued)

OTHER PUBLICATIONS

International Search Report Issued Jan. 12, 2010 in PCT/JP09/070645 filed Dec. 10, 2009.
(Continued)

Primary Examiner — Seyed Masoud Malekzadeh
(74) Attorney, Agent, or Firm — Oblon, Spivak, McClelland, Maier & Neustadt, L.L.P.

(57) ABSTRACT

A die for an underwater cutting type pelletizer, the die including a die orifice part in which a thermoplastic resin is inhibited from solidifying within the die orifices. The die can have a reduced difference in temperature between the die orifice part and an inner periphery-side fixing part for fixing the die orifice part to a mixer/extruder, and can thereby inhibit the generation of thermal stress. The die is characterized by being equipped with a heating jacket for heating the inner periphery-side fixing part, the heating jacket being disposed within the inner periphery-side fixing part along an inner annular passage formed within either the die orifice part or the inner periphery-side fixing part or both along the boundary between the die orifice part and the inner periphery-side fixing part.

6 Claims, 4 Drawing Sheets

(56) References Cited

U.S. PATENT DOCUMENTS

| | | | | |
|---|---|---|---|---|
| 3,599,286 | A * | 8/1971 | Karet | 425/464 |
| 4,123,207 | A * | 10/1978 | Dudley | 425/67 |
| 4,378,964 | A * | 4/1983 | Wolfe, Jr. | 425/463 |
| 4,720,251 | A * | 1/1988 | Mallay et al. | 425/67 |
| 4,752,196 | A * | 6/1988 | Wolfe, Jr. | 425/67 |
| 4,856,974 | A * | 8/1989 | Wolfe, Jr. | 425/67 |
| 4,857,665 | A * | 8/1989 | Hinrichs et al. | 568/851 |
| 4,934,916 | A * | 6/1990 | Lambertus | 425/67 |
| 5,017,119 | A * | 5/1991 | Tokoi | 425/142 |
| 5,989,009 | A * | 11/1999 | Matsuo | 425/464 |
| 6,638,045 | B2 * | 10/2003 | Yoshii et al. | 425/67 |
| 7,320,585 | B2 * | 1/2008 | Casalini | 425/464 |
| 7,402,034 | B2 | 7/2008 | Fridley | |
| 2001/0005516 | A1 * | 6/2001 | Yoshii et al. | 425/6 |
| 2005/0123638 | A1 * | 6/2005 | Casalini | 425/313 |
| 2006/0165834 | A1 * | 7/2006 | Fridley | 425/378.1 |
| 2006/0204604 | A1 | 9/2006 | Yamanaka et al. | |
| 2007/0254059 | A1 | 11/2007 | Fridley | |
| 2010/0129479 | A1 * | 5/2010 | Banerjee et al. | 425/6 |
| 2013/0042738 | A1 | 2/2013 | Iwasaki et al. | |

FOREIGN PATENT DOCUMENTS

| | | |
|---|---|---|
| DE | 20 2006 004 677 U1 | 7/2006 |
| JP | 44 7143 | 3/1969 |
| JP | 48 43043 | 6/1973 |
| JP | 10 264151 | 10/1998 |
| JP | 11 58374 | 3/1999 |
| JP | 11-58374 | 3/1999 |
| JP | 11 277528 | 10/1999 |
| JP | 11-277528 | 10/1999 |
| JP | 2003 220606 | 8/2003 |
| JP | 2006 168235 | 6/2006 |
| JP | 2006-168235 | 6/2006 |
| JP | 2008 528332 | 7/2008 |
| JP | 2008 207436 | 9/2008 |
| WO | 2004 080678 | 9/2004 |

OTHER PUBLICATIONS

Japanese Office Action issued Aug. 21, 2012, in Japan Patent Application No. 2008-332758 (with English Translation).

Extended European Search Report issued Dec. 4, 2013 in European Patent Application No. 09834715.6.

* cited by examiner

DIE FOR UNDERWATER CUTTING TYPE PELLETIZER

FIELD OF THE INVENTION

The present invention relates to a die for underwater cutting type pelletizer to be used in an underwater cutting type pelletizer for producing pellets of thermoplastic resin.

BACKGROUND ART

Such an underwater cutting type pelletizer includes a die (die for underwater cutting type pelletizer) attached to an end of a cylinder head of a mixer/extruder through a die holder; a water chamber provided on the downstream side of the die; a cutter driving shaft protruded into the water chamber; a cutter drive unit for rotating the cutter driving shaft; and a plurality of cutter knives fixed to the cutter driving shaft. The die has a number of die orifices. The water chamber has a water-cooling chamber which is filled with cooling water (hot water of about 60° C.) for cooling a thermoplastic resin extruded out of the mixer/extruder in such a manner that the cooling water can circulate (inflow and outflow). The cutter knives are held by a cutter holder fixed to an end of the cutter driving shaft to face a surface of the die.

In the thus-constituted underwater cutting type pelletizer, the thermoplastic resin supplied to the mixer/extruder is mixed by a screw, extruded into the water chamber in the form of strands through the die, and cut in the form of pellets by the cutter knives rotating on the surface of the die. In this way, underwater pelletization of the thermoplastic resin is performed.

A conventional die for underwater cutting type pelletizer to be used in this type of underwater cutting type pelletizers is shown, for example, in Patent Literature 1. A die for underwater cutting type pelletizer (hereinafter referred also simply to as a die body) of Patent Literature 1 aims at relaxing the thermal stress of the die body. The die body in Patent Literature 1 will be described in reference to FIG. 6. FIG. 6 is a perspective view showing a ⅛ segment structure of a conventional die for underwater cutting type pelletizer.

A die body 100 has a thick disk-like shape as the whole. The die body 100 includes a ring-like outer periphery fixing part 111, a die orifice part 112, an inner periphery fixing part 113 and a disk-like center part 115, which are disposed successively from the outer periphery toward the center. A number of outer periphery bolt holes are formed at circumferentially equal intervals in the outer periphery fixing part 111 so as to extend through from the front surface to the reverse surface in order to insert bolts for fixing the die body to a die holder.

A number of die orifices, not shown, for extruding strands, are formed in the die orifice part 112 so as to extend through from the reverse surface to the front surface. Further, a heating jacket, not shown, for distributing heated fluid (e.g., heated oil or steam) to the periphery of each die orifice (a passage through which the heated fluid flows) is formed within the die orifice part 112. The heated fluid is circulated to prevent the thermoplastic resin extruded from the mixer/extruder from being solidified within the die orifices. A plurality of inner periphery bolt holes is circumferentially formed in the inner periphery fixing part 113 so as to extend through from the front surface to the reverse surface.

In this die body 100, a temperature difference is caused between the die orifice part 112 increased in temperature by being heated by fluid of high temperature (about 300° C.) flowing in the heating jacket, and the inner periphery fixing part 113 and the center part 115 which are cooled by cooling water of about 60° C. within the water-cooling chamber of the water chamber. To reduce the thermal stress resulting from this temperature difference, the die body 100 has a cutout 114 including a slit 114b formed along the inner periphery on the front surface side of the inner periphery fixing part 113, as shown in FIG. 6.

In the die 100, a thermal stress generated on an outer periphery 113b of the inner periphery fixing part that is a boundary section between the die orifice part 112 and the inner periphery fixing part 113, namely a tensile stress generated in a radial direction is suppressed by the cutout 114, whereby the generation of damage on the die body 100 such as crack is prevented to attain an extended life of the die body 100.

However, in the die for underwater cutting type pelletizer (die body 100) of Patent Literature 1, an increased contact area between the cooling water in the water-cooling chamber of the water chamber and the inner periphery fixing part 113 due to the provision of the cutout 114 promotes the cooling of the die orifice part 112. In the die body 100 of Patent Literature 1, therefore, a new problem of solidification of the thermoplastic resin within the die orifices of the die orifice part 112 occurs. Further, the die body 100 may be deformed since the overall rigidity of the die body 100 is impaired.

RELATED ART DOCUMENTS

Patent Literature

Patent Literature 1: Japanese Patent Application Laid-Open No. 2008-207436 (FIGS. 3 to 5)

SUMMARY OF THE INVENTION

In view of the above-mentioned problems, the present invention has an object to provide a die for underwater cutting type pelletizer, capable of suppressing the generation of thermal stress by minimizing the temperature difference between the die orifice part and the inner periphery-side fixing part while suppressing the solidification of the thermoplastic resin within the die orifices of the die orifice part.

To solve the above-mentioned problems, the present invention provides a die for underwater cutting type pelletizer to be used in an underwater cutting type pelletizer for making pellets from a thermoplastic resin derived from a mixer/extruder, the die including: an annular die orifice part having a plurality of die orifices for allowing the thermoplastic resin to pass through; an outer periphery-side fixing part provided on the outer periphery side of the die orifice part to fix the die orifice part to the mixer/extruder; an inner periphery-side fixing part provided on the inner periphery side of the die orifice part to fix the die orifice part to the mixer/extruder; an outside annular passage formed within at least one of the die orifice part and the outer periphery-side fixing part along a boundary line between the die orifice part and the outer periphery-side fixing part; an inside annular passage formed within at least one of the die orifice part and the inner periphery-side fixing part along a boundary line between the die orifice part and the inner periphery-side fixing part; a communicating passage formed in an area other than the area where each die orifice is formed within the die orifice part to allow the outside annular passage to communicate with the inside annular passage, thereby circulating heated fluid to the outside annular passage and the inside annular passage to heat the die orifice part; and a heating part provided within the inner periphery-side fixing part along the inside annular passage to heat the inner periphery-side fixing part.

According to the present invention, since the inner periphery-side fixing part which contacts with cooling water of the underwater cutting type pelletizer can be heated by the heating part, the generation of thermal stress can be suppressed by minimizing the temperature difference between the die orifice part and the inner periphery-side fixing part. Accordingly, damage on the die can be prevented by suppressing the tensile stress generated in the radial direction of the die as a result of the thermal stress to attain an extended utilization life of the die.

MODE FOR CARRYING OUT THE INVENTION

Preferred embodiments of the present invention will be described in reference to the drawings.

Figure 1:
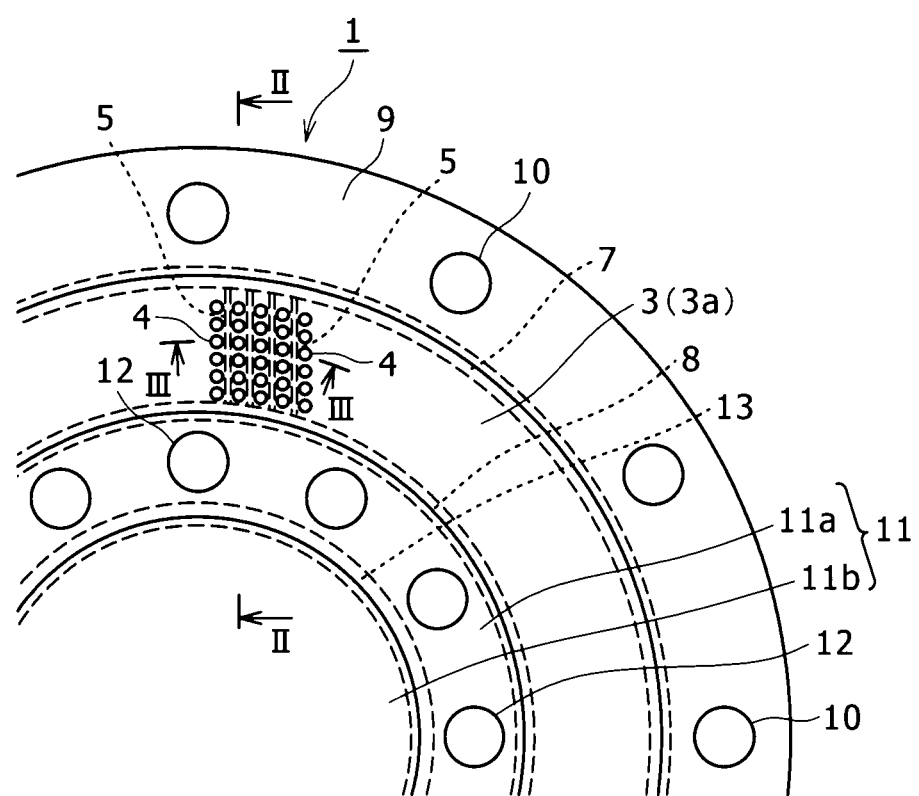
FIG. 1 is a front view schematically showing a structure of an essential part of a die for underwater cutting type pelletizer according to a first embodiment of the present invention.
Figure 2:
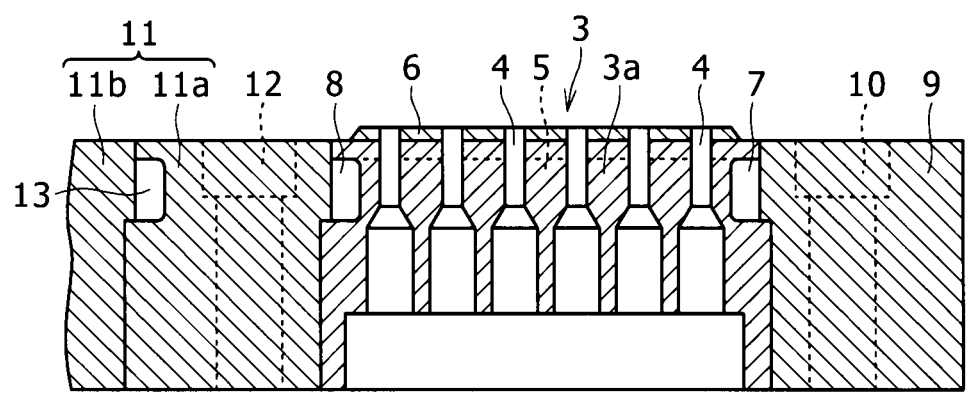
FIG. 2 is a sectional view taken along line II-II of FIG. 1.
Figure 3:
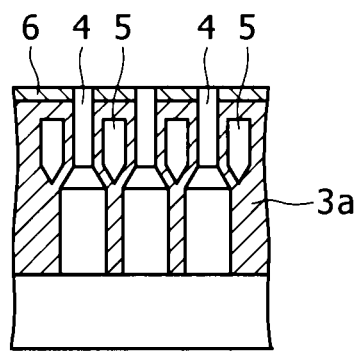
FIG. 3 is a sectional view taken along line III-III of FIG. 1.

FIG. 1 is a front view schematically showing a structure of an essential part of a die for underwater cutting type pelletizer according to a first embodiment of the present invention. FIG. 2 is a sectional view taken along line II-II of FIG. 1. FIG. 3 is a sectional view taken along line of FIG. 1.

In FIGS. 1 to 3, the die 1 for underwater cutting type pelletizer according to the first embodiment (hereinafter also referred simply to as die 1) has a disk-like shape as the whole. The die 1 includes an annular die orifice part 3; an annular outer periphery-side fixing part 9 disposed on the outer periphery side of the die orifice part 3; and a disk-like inner periphery-side fixing part 11 disposed on the inner periphery side of the die orifice part 3. In this embodiment, the inner periphery-side fixing part 11 is further divided into an annular section 11a on the outer periphery side and a disk-like section 11b on the inner periphery side, for forming a heating jacket 13 for heating the inner periphery-side fixing part, which will be described later.

A tunnel-shaped outside annular passage 7 is formed on a circular boundary surface between the die orifice part 3 and the outer periphery-side fixing part 9, and a tunnel-shaped inside annular passage 8 is formed on a circular boundary surface between the die orifice part 3 and the inner periphery-side fixing part 11 (refer to FIGS. 1 and 2). Specifically, as shown in FIG. 2, a recess opened to the outer periphery side is formed on the outer periphery of the die orifice part 3, and the outside annular passage 7 is formed between this recess and the inside surface of the outer periphery-side fixing part 9. Similarly, a recess opened to the inner periphery side is formed on the inner periphery of the die orifice part 3, and the inside annular passage 8 is formed between this recess and the outer periphery of the inner periphery-side fixing part 11. Each of the annular passages 7, 8 can be formed also by providing the recess in both of the die orifice part 3 and each fixing part 9, 11, or by providing the recess only in each fixing part 9, 11, instead of providing the recess only in the die orifice part 3 in this embodiment.

The outer periphery-side fixing part 9 located on the outer periphery side of the die orifice part 3 has a plurality of mounting bolt holes 10 for inserting bolts for fixing the die 1 to a die holder (mixer/extruder). The mounting bolt holes 10 are formed at positions at circumferentially equal intervals so as to extend through from the front surface to the reverse surface.

The die orifice part 3 will be then described. The die orifice part 3 includes an annular main body 3a of the die orifice part, a number of die holes 4 extending through the main body 3a of the die orifice part from the front surface to the reverse surface to allow a thermoplastic resin from the mixer/extruder to flow; and a number (multiple rows) of heating jackets 5 (communicating passages) for heating the main body 3a of the die orifice part to prevent the thermoplastic resin from being solidified. In the example of FIG. 1, a number of rows of die orifices, each row of die orifices including a plurality of die orifices 4 (six orifices in this embodiment), is formed in the main body 3a of the die orifice part. The heating jacket 5 is a passage which allows the outside annular passage 7 to communicate with the inside annular passage 8, as shown in FIGS. 1 and 3, to circulate heated fluid (for example, heated oil or steam). Specifically, the heating jacket 5 is provided within the main body 3a of the die orifice part so as to extend along each row of die orifices at a position near the row of die orifices concerned. A hardened layer 6 (for example, TiC hardened layer) is formed on the surface of the main body 3a of the die orifice part (FIGS. 2 and 3).

The rows of die orifices, which are not entirely but partially shown in FIG. 1, are provided over the whole body of the main body 3a of the die orifice part having the annular shape. In this case, if the main body 3a of the die orifice part is divided into a plurality of areas that are divided into the same area along the circumferential direction as viewed from the front (in this embodiment, six areas with the same area in total of three equally divided upper areas and three equally divided lower areas), about 20 to 35 rows (27 rows in this embodiment) of die orifices are provided in each divided area. Further, a center line of the row of die orifices located at the center of each divided area (a line connecting the opening centers of the respective die orifices) is directed to the center point of the inner periphery-side fixing part 11 (the center point of the die 1).

The outside annular passage 7 is divided, by a partitioning block not shown, into an upper outside annular passage having a semicircular shape protruding upwardly as viewed from the front, and a lower outside annular passage having a semicircular shape protruding downwardly as viewed from the front. A heated fluid inlet port not shown which communicates with the upper outside annular passage and a heated fluid discharge port not shown which communicates with the lower outside annular passage are provided in the outer periphery-side fixing part 9.

Thus, the heated fluid which is introduced through the heated fluid inlet port is guided from the upper outside annular passage of the outside annular passage 7 to the inside annular passage 8 through each heating jacket 5, and then pass through each lower side heating jacket 5 and the lower outside annular passage, and is discharged out of the die 1 through the heated fluid discharge port, whereby the die orifice part 3 (the part of each die orifice 4) is heated.

The inner periphery-side fixing part 11 is then described. The inner periphery-side fixing part 11 includes an outer periphery-side annular section 11a and a disk-like section 11b mounted on the inner periphery side of the annular section 11a. The annular section 11a has a number of mounting bolt holes 12 for inserting bolts to fix the die 1 to the die holder. The mounting bolt holes 12 are formed at positions at circumferentially equal intervals to extend through the annular section 11a from the front surface to the reverse surface (FIGS. 1 and 2).

Further, a heating jacket 13 for heating the inner periphery-side fixing part (heating part, heating passage) is provided within the inner periphery-side fixing part 11, as shown in FIGS. 1 and 2, so as to be laid along the inside annular passage 4. The heating jacket 13 for heating the inner periphery-side fixing part constitutes a passage for circulating heated fluid. The heating jacket 13 for heating the inner periphery-side fixing part is thus configured so that heated fluid (for example, heated oil or steam) is introduced from an upper top position as viewed from the front and discharged from a lower bottom position as viewed from the front, whereby the inner periphery-side fixing part 11 is heated and increased in temperature. When heated oil is used, the heated oil may be introduced from the lower bottom position and discharged from the upper top position.

The heated fluid to be introduced to the heating jacket 5 and the heated fluid to be introduced to the heating jacket 13 for heating the inner periphery-side fixing part may be the same or different. From the viewpoint of facility cost or the like, it is preferred to introduce the same type of fluid to each jacket 5, 13. On condition that the temperature difference between the die orifice part 3 and the inner periphery-side fixing part 11 can be reduced, compared with a structure free from the heating jacket 13 for heating the inner periphery-side fixing part, the temperature of overheated fluid to be introduced to each jacket 5, 13 may be the same or different. It is more preferable that the temperature of the overheated fluid to be introduced to each jacket 5, 13 is independently adjusted so that the temperature of the die 1 is totally equalized.

The heating jacket 13 for heating the inner periphery-side fixing part is provided between the annular section 11a and the disk-like section 11b. Specifically, as shown in FIG. 2, a recess opened to the inside is formed on the inner periphery of the annular section 11a, and the heating jacket 13 for heating inner periphery-side fixing part is formed between the recess and the outside surface of the disk-like part 11b.

In this way, the die 1 for underwater cutting type pelletizer of this embodiment is provided with the heating jacket 13 for heating the inner periphery-side fixing part, which forms a passage for circulating heated fluid within the inner periphery-side fixing part 11 contacting with cooling water filled in the water-cooling chamber of the water chamber. Therefore, according to this die 1, since the temperature difference between the die orifice part 3 and the inner periphery-side fixing part 11 can be minimized, unlike in the past, by heating the inner periphery-side fixing part 11, damage on the die can be prevented, by suppressing the generation of thermal stress which results in generation of tensile stress in the radial direction of the die, to attain an extended utilization life of the die.

Figure 4:
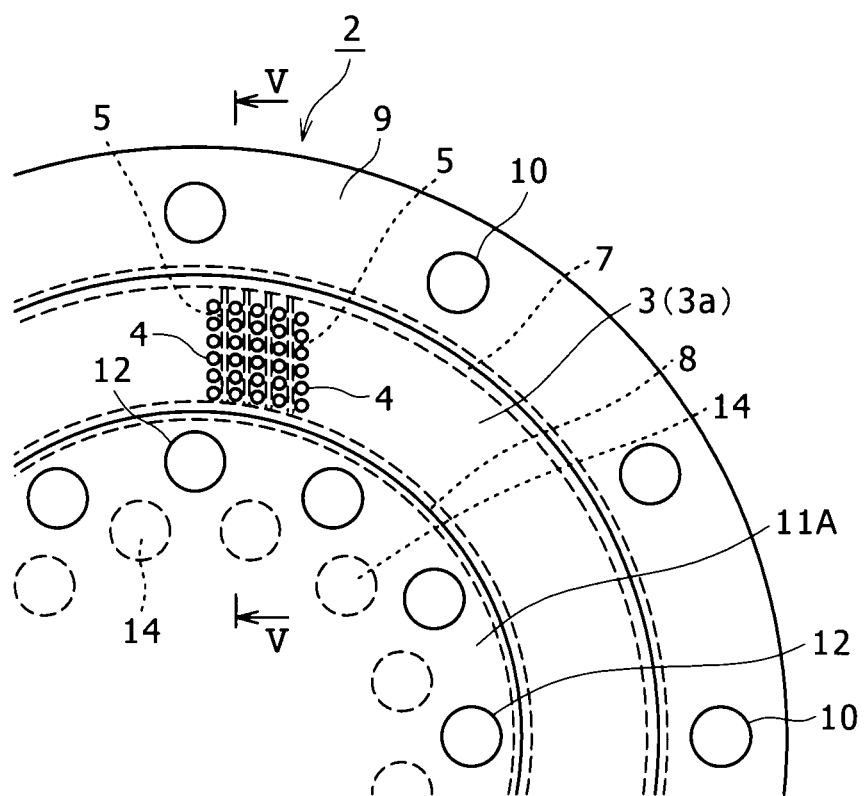
FIG. 4 is a front view schematically showing a structure of an essential part of a die for underwater cutting type pelletizer according to a second embodiment of the present invention.
Figure 5:
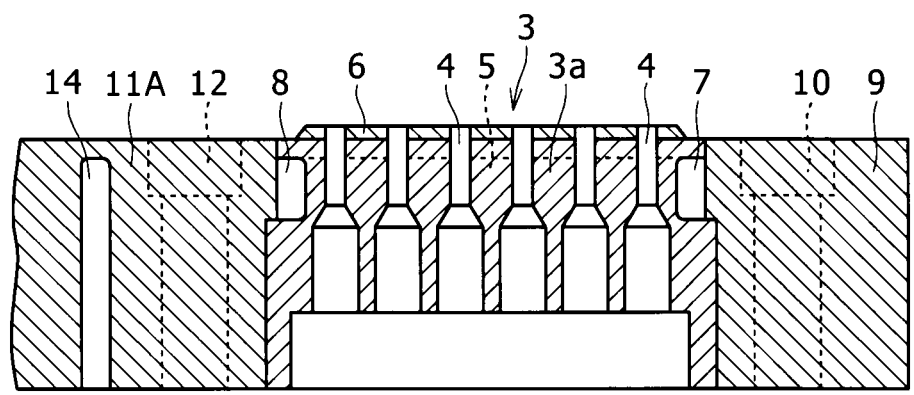
FIG. 5 is a sectional view taken along line V-V of FIG. 4.
Figure 6:
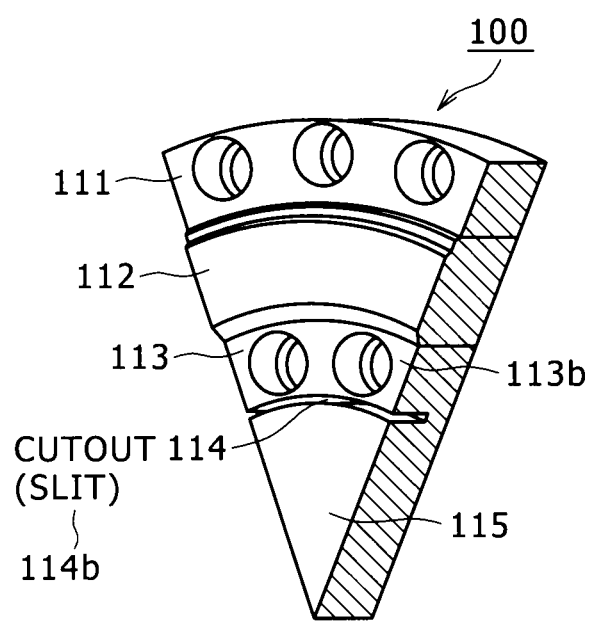
FIG. 6 is a perspective view showing a ⅛ segment structure of a conventional die for underwater cutting type pelletizer.

FIG. 4 is a front view schematically showing a structure of an essential part of a die for underwater cutting type pelletizer according to a second embodiment of the present invention. FIG. 5 is a sectional view taken along line V-V of FIG. 4. The part differed from the die 1 for underwater cutting type pelletizer according to the first embodiment will be described below while assigning the same reference numbers to the components in common therewith to omit descriptions therefor.

The die 2 for underwater cutting type pelletizer according to the second embodiment includes, as shown in FIGS. 4 and 5, a plurality of cartridge heaters 14 which is provided within an inner periphery-side fixing part 11A. The cartridge heaters 14 are disposed at positions at circumferentially equal intervals on a circular trajectory laid along the inside annular passage 8. Specifically, each of the cartridge heaters 14 is provided within a hole of the inner periphery-side fixing part 11A, which is opened to the reverse side and located at a position closer to the inner side than each mounting bolt hole 12. The same number of the cartridge heaters 14 as the mounting bolt holes 12 are provided so as to be located at positions circumferentially different from those of mounting bolt holes 12 with the same pitch as the mounting bolt holes 12. Since each cartridge heater 14 is provided at the position circumferentially different from that of each mounting bolt hole 12, transfer of heat from the cartridge heater 14 to the die orifice part 3 can be effectively performed through the inner periphery-side fixing part 11A.

The cartridge heaters 14 are used, for example, by being inserted to a press mold for hot plate forming machine. Concretely, each cartridge heater 14 is constituted by building a bar-like ceramic core with a heating wire wound thereon into a small diameter cylinder-like sheath closed at one end, and apparently has a small diameter columnar shape.

In this way, the die 2 for underwater cutting type pelletizer according to this embodiment is provided with the cartridge heaters 14 disposed within the inner periphery-side fixing part 11A contacting with the cooling water filled in the water-cooling chamber of the water chamber. Therefore, since the temperature difference between the die orifice part 3 and the inner periphery-side fixing part 11A can be minimized, unlike in the past, by heating the inner periphery-side fixing part 11A, the generation of thermal stress which results in generation of tensile stress in the radial direction of the die 2 can be suppressed, and damage on the die can be thus prevented to attain an extended utilization life of the die.

In the die 2 for underwater cutting type pelletizer, a ceramic heater or the like can be used as the electric heater instead of the above-mentioned cartridge heater 14. Specifically, a passage like the heating jacket 13 for heating the inner periphery-side fixing part may be provided, for example, within the inner periphery-side fixing part 11, as shown in FIG. 1, to dispose a ceramic heater having a substantially annular shape within the passage.

The present invention is never limited by each embodiment described above, and the shape, structure, material, combination or the like of each member can be properly changed without changing the gist of the present invention. For example, in the first embodiment, the inner periphery-side fixing part 11 can be divided not in the radial direction but in the thickness direction although it is radially divided into the outside annular section 11a and the inside disk-like section 11b for forming the heating jacket 13 for heating the inner periphery-side fixing part. Namely, the inner periphery-side fixing part 11 can be divided into a part having a groove and a lid for closing the groove in the thickness direction to form the heating jacket 13 for heating the inner periphery-side fixing part between the groove and the lid. The hardened layer 6 on the surface of the main body 3a of the die orifice part can be formed by an appropriate method such as thermal spraying of hard material or adhesion of hard material.

The above-mentioned concrete embodiments mainly involve an invention having the following structure.

According the present invention, the die for underwater cutting type pelletizer to be used in an underwater cutting type pelletizer for making pellets from a thermoplastic resin derived from a mixer/extruder includes: an annular die orifice part having a plurality of die orifices for allowing the thermoplastic resin to pass through; an outer periphery-side fixing part provided on the outer periphery side of the die orifice part to fix the die orifice part to the mixer/extruder; an inner periphery-side fixing part provided on the inner periphery side of the die orifice part to fix the die orifice part to the mixer/extruder; an outside annular passage formed within at least one of the die orifice part and the outer periphery-side fixing part along a boundary line between the die orifice part and the outer periphery-side fixing part; an inside annular passage formed within at least one of the die orifice part and the inner periphery-side fixing part along a boundary line between the die orifice part and the inner periphery-side fixing part; a communicating passage formed in an area other than the area where each die orifice is formed within the die orifice part to allow the outside annular passage to communicate with the inside annular passage, thereby circulating heated fluid to the outside annular passage and the inside annular passage to heat the die orifice part; and a heating part provided within the inner periphery-side fixing part along the inside annular passage to heat the inner periphery-side fixing part.

According to the present invention, since the inner periphery-side fixing part which contacts with cooling water of the underwater cutting type pelletizer can be heated by the heating part, the generation of thermal stress can be suppressed by minimizing the temperature difference between the die orifice part and the inner periphery-side fixing part. Accordingly, damage on the die can be prevented by suppressing the generation of tensile stress in the radial direction of the die as a result of the thermal stress to attain an extended utilization life of the die.

Specifically, the heating part can include a heating passage provided within the inner periphery-side fixing part, and the inner periphery-side fixing part can be heated by circulating heated fluid to the heating passage.

Otherwise, the heating part can include a heater provided within the inner periphery-side fixing part.

In the above-mentioned die for underwater cutting type pelletizer, it is preferable that the inner periphery-side fixing part has bolt holes for inserting bolts for fixing the die to the mixer/extruder, and the heating part is provided at a position closer to the inner periphery side than the bolt holes.

According to this structure, since the range in which the bolt holes susceptible to the effect of the tensile stress associated with thermal stress are formed can be effectively heated between the heating part and the inner periphery-side annular passage, the utilization life of the die can be further effectively extended.

The invention claimed is:

1. A die for underwater cutting type pelletizer to be used in an underwater cutting type pelletizer for making pellets from a thermoplastic resin derived from a mixer/extruder, the die comprising:

an annular die orifice part having a plurality of die orifices for allowing the thermoplastic resin to pass through;

an outer periphery-side fixing part provided on the outer periphery side of said die orifice part to fix said die orifice part to the mixer/extruder;

an inner periphery-side fixing part provided on the inner periphery side of said die orifice part and having at least one fixing element configured to fix said die orifice part to the mixer/extruder;

an outside annular passage formed within at least one of said die orifice part and said outer periphery-side fixing part along a boundary line between said die orifice part and said outer periphery-side fixing part;

an inside annular passage formed within at least one of said die orifice part and said inner periphery-side fixing part along a boundary line between said die orifice part and said inner periphery-side fixing part;

a communicating passage formed in an area other than the area where each die orifice is formed within said die orifice part to allow said outside annular passage to communicate with said inside annular passage, thereby circulating heated fluid to said outside annular passage and said inside annular passage to heat said die orifice part; and a heating part provided within said inner periphery-side fixing part along said inside annular passage, and positioned closer to the inner periphery side than said at least one fixing element, to heat said inner periphery-side fixing part and to minimize a temperature difference between the die orifice part and the inner periphery-side fixing part.

2. The die for underwater cutting type pelletizer according to claim 1, wherein said heating part includes a heating passage provided within said inner periphery-side fixing part, and said inner periphery-side fixing part is heated by circulating heated fluid to said heating passage.

3. The die for underwater cutting type pelletizer according to claim 1, wherein said heating part includes a heater provided within said inner periphery-side fixing part.

4. The die for underwater cutting type pelletizer according to claim 1, wherein said at least one fixing element comprises bolt holes holding bolts for fixing the die to the mixer/extruder, and said heating part is provided at a position closer to the inner periphery side than said bolt holes.

5. The die for underwater cutting type pelletizer according to claim 1, wherein said heating part comprises an annular heating passage.

6. The die for underwater cutting type pelletizer according to claim 4, wherein said heating part comprises an annular heating passage.

* * * * *